Aug. 28, 1962

E. H. MERNYK 3,051,009

COMPENSATED INTEGRATOR

Filed Feb. 6, 1961

INVENTOR
EDWIN H. MERNYK
BY Borst & Borst
ATTORNEYS

INVENTOR
EDWIN H. MERNYK
BY Borst & Borst
ATTORNEYS

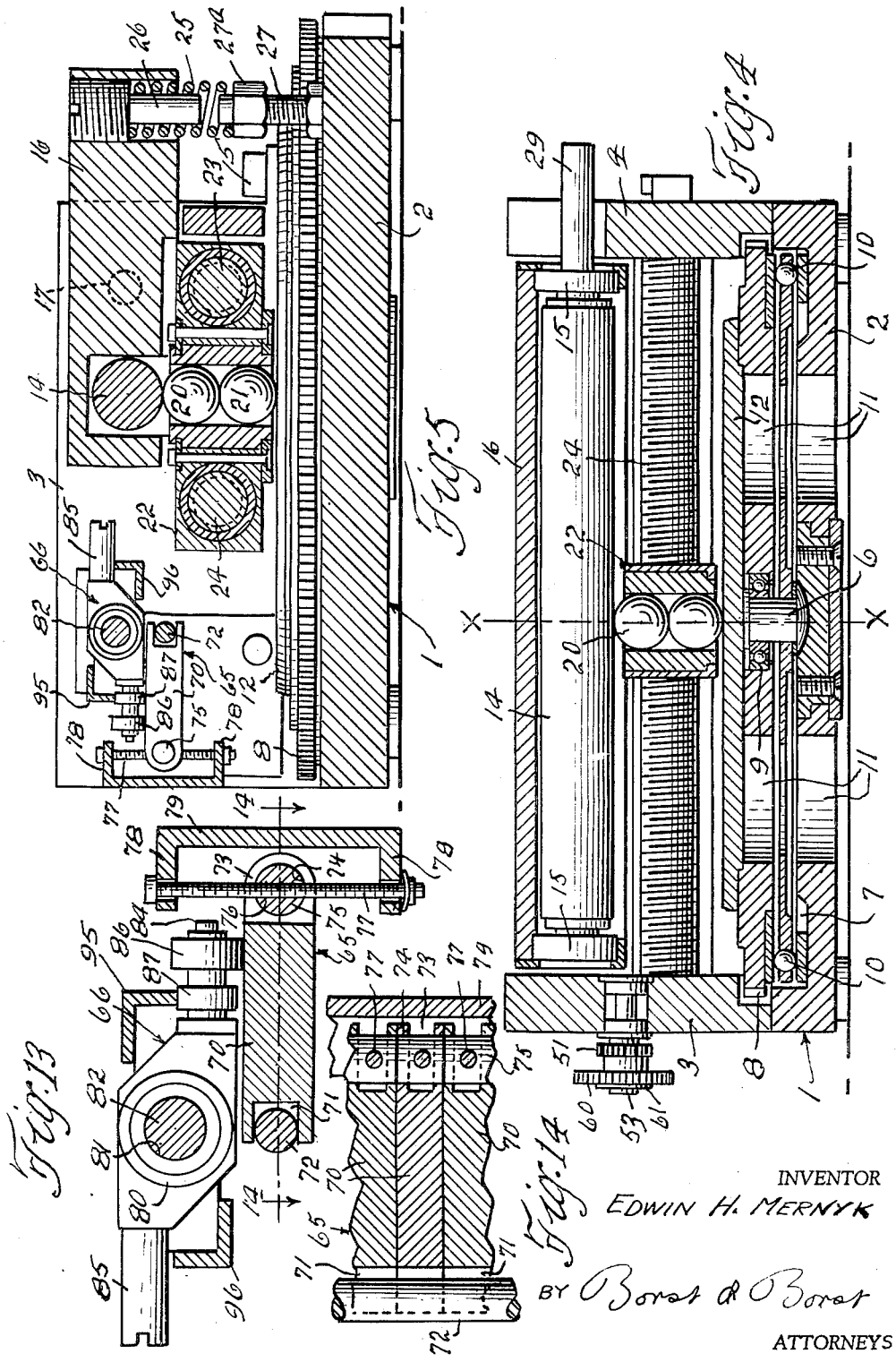

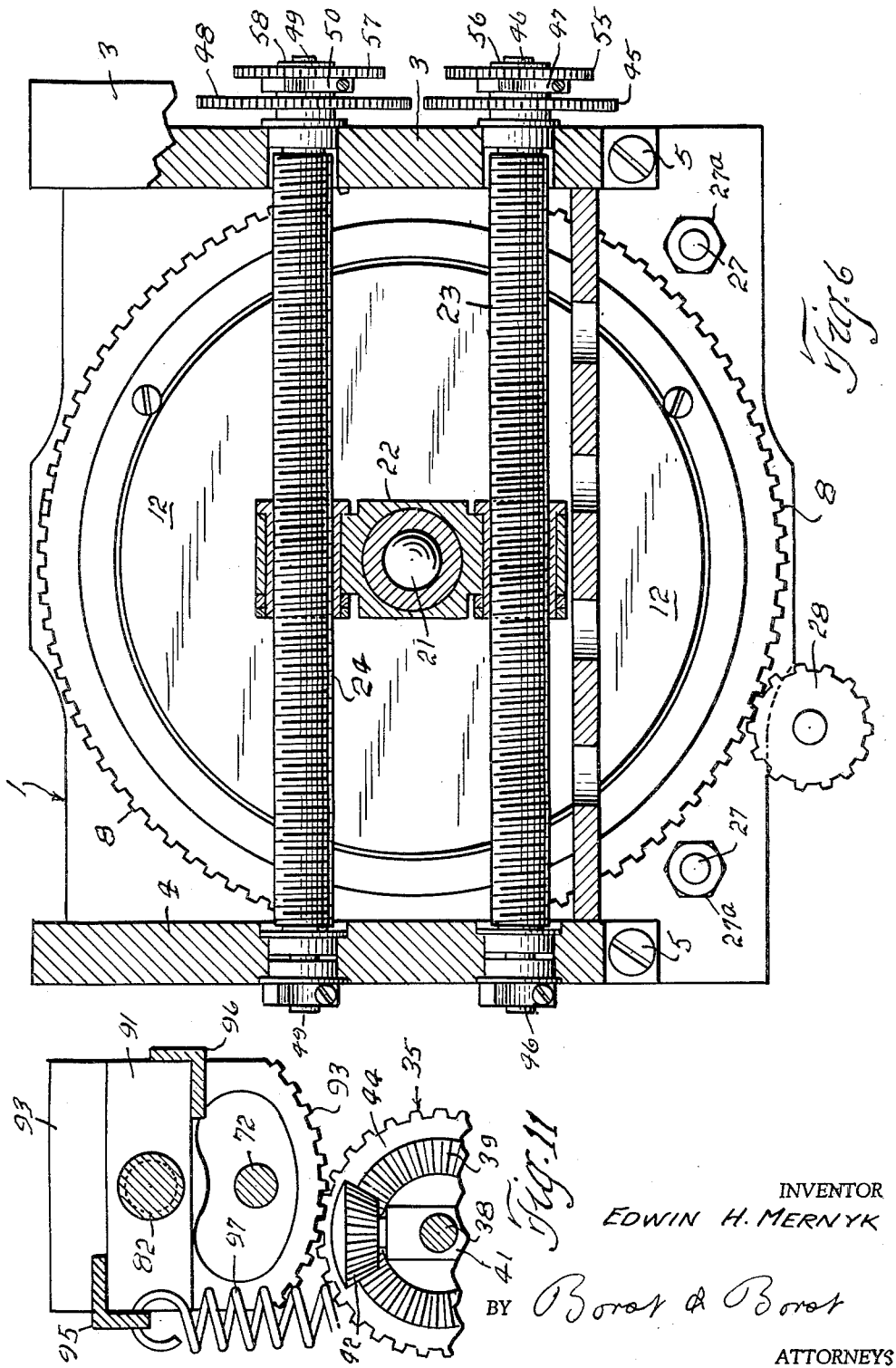

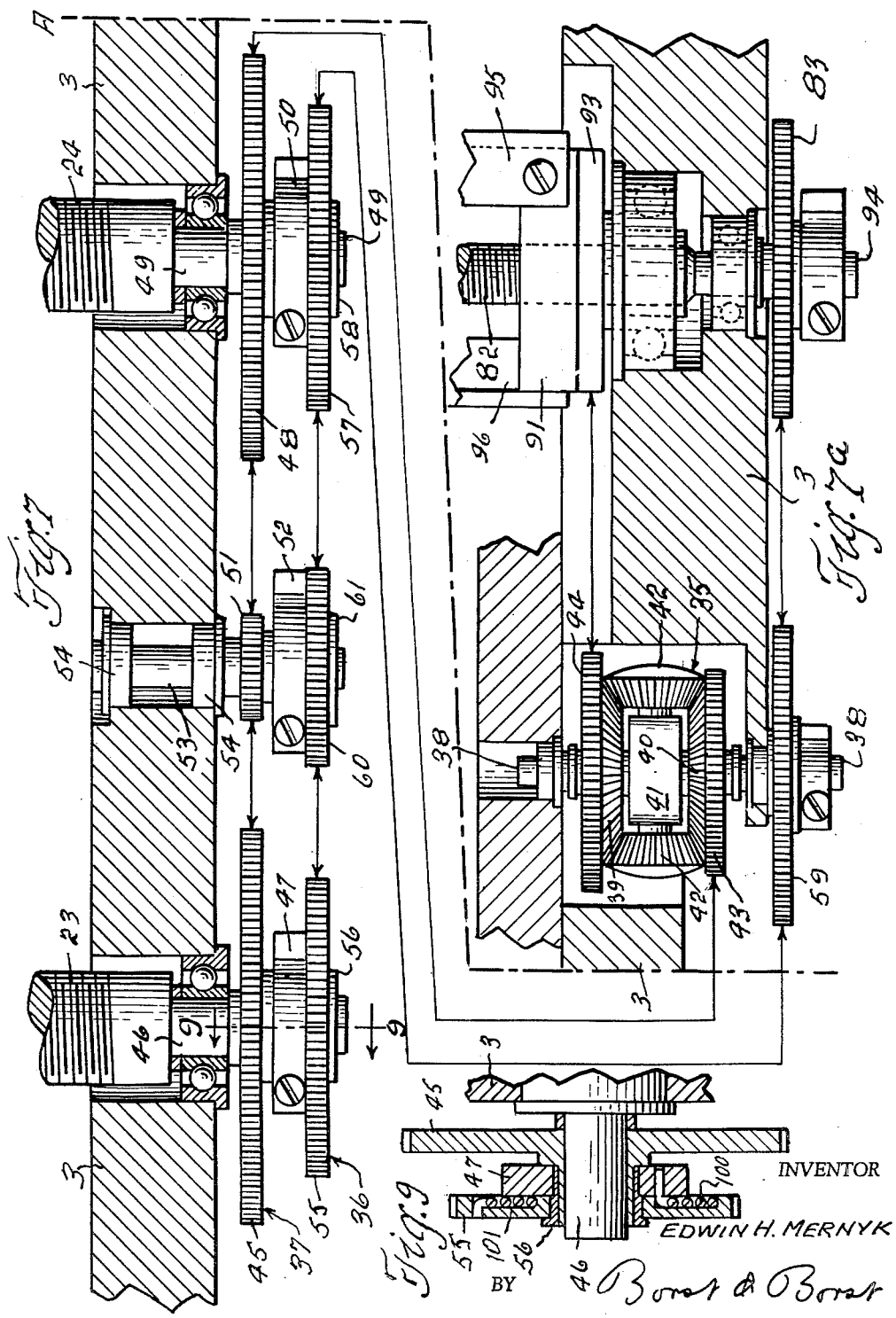

United States Patent Office 3,051,009
Patented Aug. 28, 1962

3,051,009
COMPENSATED INTEGRATOR
Edwin H. Mernyk, Old Bridge, N.J., assignor to Sperry Rand Corporation, Ford Instrument Company Division, Wilmington, Del., a corporation of Delaware
Filed Feb. 6, 1961, Ser. No. 87,264
12 Claims. (Cl. 74—198)

This invention relates generally to calculating mechanisms which are extensively used for automatically computing various types of data including gun fire control data and both air and sea navigation data. More specifically, the invention relates to a mechanical integrator which is a component part of such calculating mechanisms.

The integrator with which this invention is concerned is generally known as a DBR integrator or disk, ball and roller integrator. Such integrators comprise a rotatable disk, a roller which is spaced from the disk with the axis thereof disposed perpendicular to and intersecting the axis of the disk, and a pair of contacting balls which are interposed between the disk and the roller with one of the balls contacting the disk and the other of the balls contacting the roller. The balls are mounted in a carriage which in turn is mounted upon a pair of lead screws the axes of which are parallel to the axis of the roller. The lead screws are operative to move the carriage and with it the balls back and forth across the disk. The rotation of the disk will impart rotation to the balls which in turn impart rotation to the roller. A fixed r.p.m. of the disk will impart through the balls a proportional r.p.m. to the roller, the closer the balls are to the axis of the disk the lesser the r.p.m. imparted to the roller and vice versa; the farther the balls are from the axis of rotation of the disk the greater the r.p.m. imparted to the roller. In operation one value is imparted to the disk and another value is imparted to the lead screws and the output of the roller is the resultant or integral of the two values imparted to the integrator. For every theoretical position of the carriage there is a theoretically correct integrator output which can be calculated. Knowing the r.p.m. of the disk and the diameter of the roller the output in r.p.m.'s of the roller can be accurately figured for any and every position of the carriage and balls between the axis of the disk and the periphery thereof. The accuracy of the integrator can then be checked by comparing the actual output of the roller with the calculated output.

It has been found in practice that the actual output of the roller does not always agree with the calculated output thereof and that this is due to various factors, such as operating clearances, deviation in manufacturing tolerances, variation in the diameter of the roller, and backlash. Obviously, if the diameter of the roller at a given point is less than the calculated diameter, the output of the roller in r.p.m.'s will be greater than the calculated output and if it is greater than the calculated diameter the output in r.p.m.'s will be less than the calculated output.

By varying the carriage position slightly from its normal position, the correct output can be obtained. In accordance with the present invention means are provided by which the position of the carriage is automatically adjusted in accordance with known error factors.

It is therefore the primary purpose of the invention to provide an ultra-precision integrator of the aforesaid type, in which the component parts thereof may have the same or looser tolerances than an integrator of the same type with much less accuracy.

Another object of this invention is to provide means in a mechanical integrator of the aforesaid type by which manufacturing tolerances in the construction thereof may be automatically compensated for.

The principal objects of the invention having been stated, other and more limited objects of the invention will be apparent from the following specification and the accompanying drawings forming a part thereof in which:

FIG. 4 is a vertical longitudinal section taken on the line 4—4 on FIG. 1;

FIG. 5 is a vertical transverse section taken substantially on the line 5—5 on FIG. 1, with the disk and supporting means therefor being in elevation;

FIG. 6 is a horizontal section, the plane of the section being indicated by the line 6—6 on FIG. 2;

Figure 1:
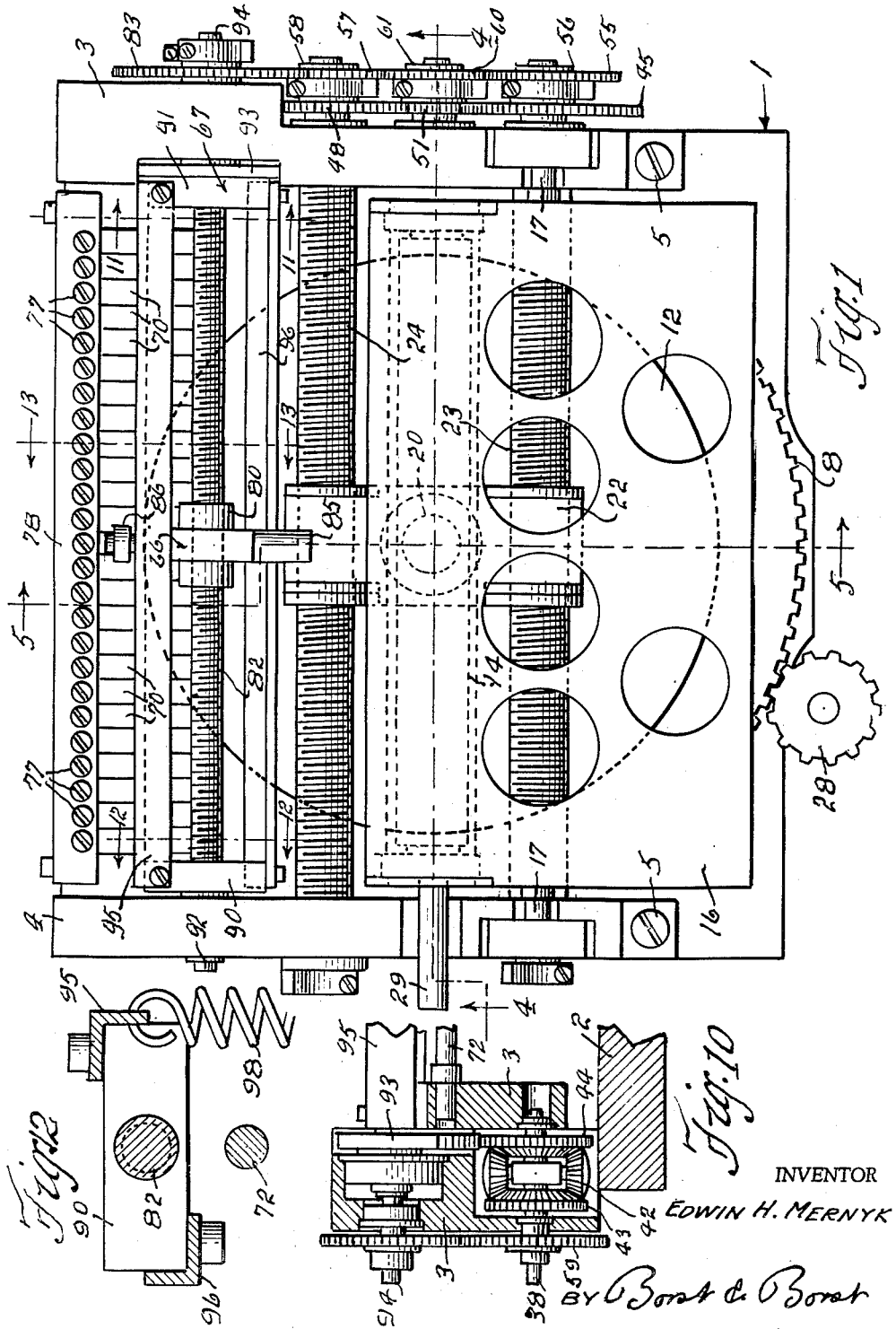
FIG. 1 is a top plan view of an integrator constructed according to my invention.
Figure 2:
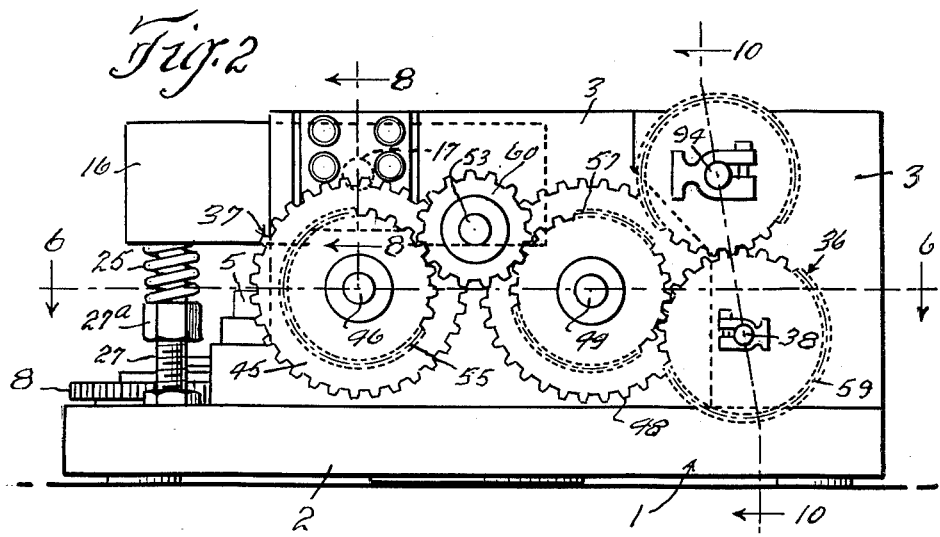
FIG. 2 is a side elevation looking from the right of FIG. 1.
Figure 3:
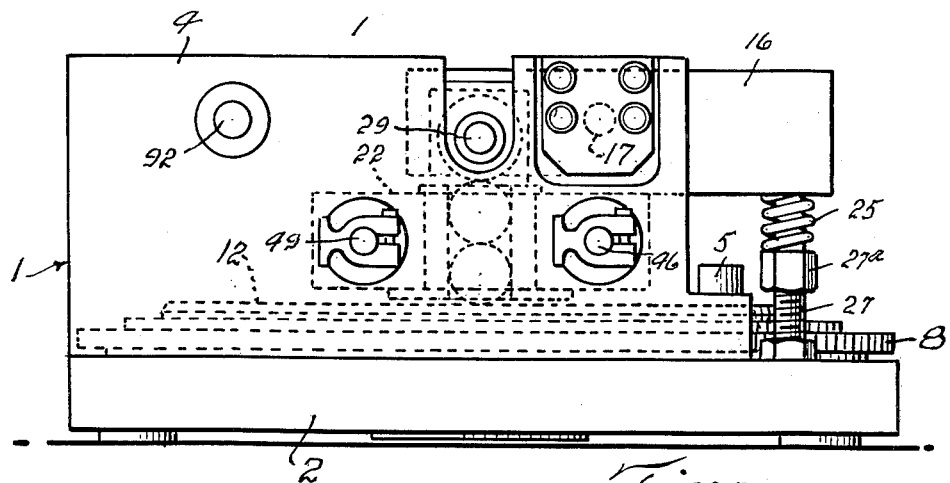
FIG. 3 is a side elevation looking from the left of FIG. 1.
Figure 8:
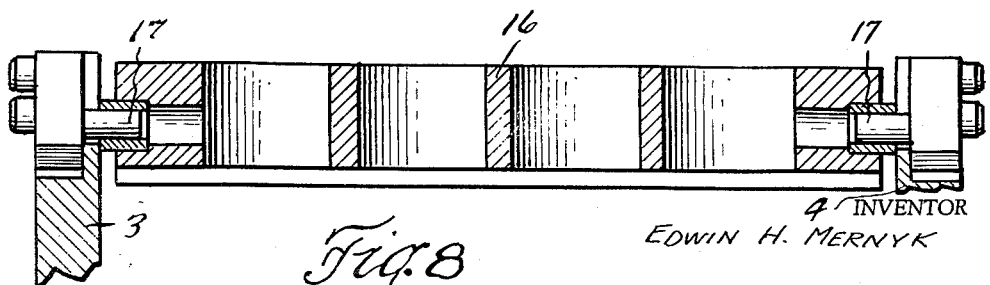

FIGS. 7 and 7a joined together at the line A—A constitute a shaft diagram in which various parts of the integrator are shown in the same plane with the various meshing gears connected together by lead lines;

FIG. 8 is a fragmentary detail vertical section the plane of which is indicated by the line 8—8 on FIG. 2;

FIG. 9 is an enlarged detail vertical section taken on the line 9—9 on FIG. 7;

FIG. 10 is a fragmentary detail vertical section, taken on the line 10—10 on FIG. 2;

FIG. 11 is an enlarged detail section taken substantially on the line 11—11 on FIG. 1;

FIG. 12 is an enlarged detail vertical section, the plane of which is indicated by the line 12—12 on FIG. 1;

FIG. 13 is an enlarged vertical section, the plane of which is indicated by the line 13—13 on FIG. 1; and FIG. 14 is a horizontal detail section taken on the line 14—14 on FIG. 13.

Referring now to the drawings by reference characters the numeral 1 indicates generally a conventional well-known mechanical integrator having my invention incorporated therein. The integrator 1 comprises a horizontal base 2 having a pair of spaced parallel upwardly extending similar supports 3 and 4 suitably secured thereto as by bolts or screws 5. The base 2 is provided with a central upwardly extending post 6 and an annular recess 7 in the upper surface thereof. A gear 8 is rotatably mounted upon the post 6 by means of an anti-friction bearing 9 and is supported adjacent the periphery thereof by a thrust bearing 10 which is disposed in the annular recess 7 in the upper surface thereof. The base 2 and gear 8 are provided with cutouts 11 for the sake of lightness. A disk 12 is suitably secured to the upper face of the gear 8 for rotation therewith. A cylindrical roller 14 is disposed between the supports 3 and 4 above and in spaced relation to the disk 12 with the axis of the roller 14 perpendicular to and intersecting the axis X—X of the disk 12 and gear 8. The roller 14 is rotatably supported by anti-friction bearings 15 carried by a rectangular plate 16 which is pivotally mounted between the upper ends of the supports 3 and 4 upon a pair of opposed axially aligned pivot studs 17 which are carried by the supports 3 and 4.

A pair of similar vertically aligned contacting balls 20 and 21 having the centers thereof disposed in a vertical plane which includes the axes of the roller 14 and disk 12 are mounted in a carriage 22 with the ball 20 in contact with the roller 14 and the ball 21 in contact with the disk 12. The carriage 22 is mounted upon a pair of spaced parallel lead screws 23 and 24 which are rotatably supported by and between the supports 3 and 4 with the axes thereof parallel to the axis of the roller 14. Rotation of the lead screws 23 and 24 will move the carriage 22 and with it the balls 20 and 21 back and forth across the disk 12. The balls 20 and 21 are maintained in firm contact with each other and with the disk 12 and roller 14 by a pair of compression springs 25 which are interposed between fixed studs 26 carried by the plate 16 adjacent the rear end thereof and studs 27 which are aligned with studs 26 and carried by the base 2. The springs 25 tend to rock the plate 16 about its supporting pivot studs 17 and yieldingly hold the roller 14 in firm contact with the ball 20. The pressure exerted by the springs 25 may be regulated by adjusting the nuts 27a up or down on the studs 27.

In use the gear 8 and disk 12 are rotated by a gear 28 which meshes with the gear 8 and is suitably connected to one input source; and the lead screws 23 and 24 are rotated in unison from another input source by suitable driving means to be described hereinafter. Rotation of the disk 12 imparts rotation to the roller 14 through the balls 20 and 21; and the output of the roller 14 is delivered to a receiving source through the roller shaft 29 secured to the end thereof. The r.p.m.'s imparted to the roller 14 for a given r.p.m. of the disk 12 are dependent upon the distance of the line of contact between the disk, balls and roller from the axis X—X of the disk 12 and the diameter of the roller at the line of contact The farther the line of contact is from the axis X—X of the disk 12 the greater the number of r.p.m.'s imparted to the roller 14 per r.p.m. of the disk 12; and the smaller the diameter of the roller 14 at the line of contact the greater the number of r.p.m.'s imparted to the roller 14 per r.p.m. of the disk 12; the integrator thus far described is of standard well-known construction.

The driving mechanism for the lead screws 23 and 24, which comprises generally a mechanical differential 35, an input gear train 36 through which motion is imparted to the differential 35, and an output gear train 37 through which motion is imparted from the differential 35 to the lead screws 23 and 24, will now be described. The differential 35 is a conventional mechanical differential which comprises a spider shaft 38 on which a pair of spaced opposed similar bevel gears 39 and 40 are rotatably mounted. A spider 41 which is rigidly secured on the spider shaft 38 between the bevel gears 39 and 40 carries a pair of similar bevel pinion gears 42 which are disposed in mesh with the bevel gears 39 and 40. The bevel gear 39 has a spur gear 44 rigidly secured thereto for rotation therewith, and the bevel gear 40 has a spur gear 43 rigidly secured thereto for rotation therewith.

The output gear train 37 through which motion is imparted from the differential to the lead screws 23 and 24 comprises a spur gear 45 which is rigidly secured to the shaft 46 of the lead screw 23 by a clamp 47, and a similar spur gear 48 which is rigidly secured to shaft 49 of the lead screw 24 by a clamp 50. The gear 48 is disposed in mesh with the spur gear 43 which is secured to the differential bevel gear 40; and an idler gear 51 which is rigidly secured by a clamp 52 to a stub shaft 53 which is rotatably mounted in bearing 54 carried by the support 3, is interposed between the gears 45 and 48 in mesh therewith. It will therefore be seen that rotation of the differential gear 40 will be imparted through the spur gear 43 secured thereto to the lead screws 23 and 24 through the gears 45 and 48 and the idler gear 51.

The input gear train 36 through which motion is imparted to the differential 35 comprises a spur gear 55 which is rotatably mounted upon the hub 56 of the spur gear 45, and a similar spur gear 57 which is rotatably mounted in a like manner on the hub 58 of the spur gear 48. The gear 57 is disposed in mesh with a spur gear 59 which is rigidly secured to the spider shaft 38 of the differential 35; and an idler gear 60 which is rotatably mounted upon the hub 61 of the idler gear 51 is interposed between the gears 55 and 57 in mesh therewith.

A preloaded spiral spring 100, which is disposed about the hub 56 of the gear 45 within a recess 101 in the inner face of the gear 55 with one end thereof connected to the clamp 47 and the other end thereof connected to the gear 55, is provided to eliminate backlash in the various gear trains.

From the foregoing it will be apparent that when the differential gear 39 is maintained stationary, as is normally the case, rotary motion imparted by the input gear train 36 to the differential 35 will be imparted from the differential 35 to the lead screws 23 and 24 through the output gear train 37. It will also be apparent, that due to the inherent characteristics of mechanical differentials of this character, that when the differential bevel gear 39 is slightly rotated in one direction from normal at rest position, the rotation of the lead screws 23 and 24 will be advanced; and that when the differential bevel gear 39 is slightly rotated in the opposite direction from normal at rest position that the rotation of the lead screws 23 and 24 will be retarded. It will also be apparent that when the lead screws 23 and 24 are retarded or advanced that the position of the carriage 22 and balls 20 and 21 will be moved from assumed position toward or away from the axis X—X of the disk 12 which will decrease or increase the r.p.m. output of the roller 14 through the roller shaft 29.

It is this inherent characteristic of mechanical differentials that is utilized by the compensating mechanism in automatically compensating for known factor errors in the output of the integrator and which compensating mechanism will now be described. This compensating mechanism comprises generally a cam means 65 which is disposed parallel to and extends from end to end of the lead screws 23 and 24, a cam follower 66 which is yieldingly maintained in contact with said cam means, driving means 67 by which said cam follower is moved longitudinally back and forth in unison with the carriage 22 and balls 20 and 21, and means 68 by which rotary motion imparted to the cam follower 66 is imparted to the differential bevel gear 39 through the spur gear 44 secured thereto.

The cam means 65 comprises a plurality of similar cam segments 70 which are contiguously mounted for independent vertical adjustment. Each of the segments 70 is transversely bifurcated at one end thereof, as shown at 71, for the reception of a fixed pivot shaft 72, about the axis of which the cam segments are adapted to be swung up or down during adjustment. At the other end thereof each of the cam segments is vertically bifurcated as indicated at 73 and transversely bored as indicated at 74. A roller 75, having a diametrical internally threaded bore 76 therein into which an elongated adjusting screw 77 is threaded, is rotatably mounted in the transverse bore 74. The individual adjusting screws 77 for each of the cam segments 70 are all rotatably mounted in and between the side flanges 78 of a channel iron 79 which is secured to and extends between the side members 3 and 4.

The cam follower 66, and the driving means 67 therefor by which the cam follower is moved back and forth in unison with the ball carriage 22, comprise a hub 80 having an internally threaded bore 81 by which it is threaded onto an elongated lead screw 82 which is supported by and extends between the side members 3 and 4. The lead screw 82 has the same thread pitch as the carriage lead screws 23 and 24 and is adapted to be rotated in unison with the lead screws 23 and 24 through a spur gear 83 which is secured to one end thereof in mesh with the gear 59 of the input gear train 36. It will therefore be seen that the ball carriage 22 and the cam follower 66 are adapted to be moved back and forth in unison, it being understood that the center line of the cam follower 66 is in alignment with the center line of the ball carriage 22 as is clearly shown in FIGS. 1 and 5.

The cam follower hub 80 has a stud shaft 84 secured thereto and extending outwardly from one side thereof and a counterweight 85 secured thereto and extending outwardly from the opopsite side thereof. A ball bearing 86, which is adapted to be yieldingly maintained in contact with the cam means 65 as the cam follower 66 is moved back and forth by the lead screw 82, is suitably mounted on the shaft 84 adjacent the outer end thereof; and a ball bearing 87, of lesser outside diameter than the ball bearing 86, is suitably secured on the shaft 84 between the bearing 86 and the hub 80.

The means 68, by which the bearing 86 is maintained in contact with the cam means 65 and by which rotary motion imparted to the cam follower as it is moved back and forth by the lead screw 82 is imparted to the differential 35, comprises a pair of spaced parallel blocks 90 and 91. The block 90 is rotatably mounted about the unthreaded end 92 of the lead screw 82 adjacent the support 4, and the block 91, which has a gear segment 93 rigidly secured thereto, is rotatably mounted about the unthreaded end 94 of the lead screw 82 adjacent the support 3 with the gear segment 93 in mesh with the spur gear 44 secured to the differential bevel gear 39. The blocks 90 and 91 are connected together by a pair of links 95 and 96 which are L-shaped in cross section. The link 95 is secured to the top of the blocks 90 and 91 at one end thereof with the vertical section of the link extending downwardly into engagement with the roller 87; and the link 96 is secured to the bottom of the blocks 90 and 91 at the opposite end thereof with the vertical section of the link extending upwardly under the counterweight 85. A coiled tension spring 97 has the lower end thereof connected to the base 2 and the upper end thereof connected to the link 95 adjacent the block 91; and a similar coiled tension spring 98 has the lower end thereof connected to the base 2 and the upper end thereof connected to the link 95 adjacent the block 90. The springs 97 and 98 are operative to yieldingly maintain the link 95 in contact with the roller 87 and thereby yieldingly maintain the roller 86 in contact with the cam means 65 as the cam follower 66 is moved back and forth by the lead screw 82. Variations in the adjusted positions of the various cam segment 70 will impart rocking movement to the cam follower 66, and to the means 68 just described, which in turn will be imparted to the differential 35 through the gear segment 93.

As previously stated, for every theoretical position of the carriage 22 and balls 20 and 21 with respect to the axis of rotation of the disk 12 there is a theoretically correct integrator output which can be calculated, and that any error in the input can be corrected by slightly shifting the position of the carriage and balls with respect to the axis of the disk. It was also previously pointed out that any rotation imparted to the differential bevel gear 39 will advance or retard the rotation of the lead screws 23 and 24 which will change the position of the carriage 22 with respect to the axis of rotation X—X of the disk 12 and thereby increase or decrease the r.p.m. output of the roller 14.

In assembling and testing the integrator 1, for accuracy, the theoretically correct integrator output, for a given r.p.m. of the disk 12, is calculated for various different positions of the carriage and balls. The integrator is then operated with the carriage and balls in their various different positions and the actual outputs checked with the calculated outputs. If there is any variation between calculated output and actual output at any position of the carriage and balls the cam segment 70 associated with this position is adjusted up or down as needed until the calculated and actual outputs are equal.

From the foregoing it will be apparent to those skilled in this art that I have provided a relatively simple and very effective mechanism for accomplishing the objects of this invention.

It is to be understood that I am not limited to the specific construction shown and described herein, as various modifications can be made therein within the spirit of the invention and the scope of the appended claims.

What is claimed is:

1. In a mechanical integrator having a base, a pair of spaced parallel supporting brackets secured to said base and extending outwardly therefrom, a disk rotatably mounted on said base between said brackets, a roller the rotation of which represents the output of said integrator rotatably mounted between said brackets with the axis thereof disposed perpendicular to and intersecting the axis of said disk, lead screw means rotatably supported by and between said brackets with the axis thereof disposed parallel to the axis of said roller, a carriage mounted on said lead screw means for back and forth movement radially of said disk, and a pair of contacting balls carried by said carriage with one of said balls engaging said disk and the other of said balls engaging said roller, that improvement which comprises; a mechanical differential having a spider shaft with a spider secured thereon, a pair of spaced similar bevel gears rotatably mounted on said spider shaft one on each side of said spider, and a pair of pinion gears carried by said spider in mesh with each of said bevel gears, a first gear train connected to said spider shaft through which said spider shaft is rotated, a second gear train interposed between one of said bevel gears and said lead screw means through which said lead screw means is rotated, and adjustable compensating means connected to the other of said bevel gears by which the rotation of said lead screw means is automatically advanced or retarded in accordance with known errors in the output of said integrator.

2. The improvement in mechanical integrators as defined by claim 1 in which said compensating means comprises vertically adjustable cam means which is disposed parallel to said lead screw means and extends from end to end thereof, a rotatably mounted cam follower which is maintained in contact with said cam means, means by which said cam follower is moved longitudinally back and forth in unison with the movement of said carriage, and means by which rotary movement imparted to said cam follower by said cam means is imparted to the said other bevel gear.

3. The improvement in mechanical integrators as defined by claim 2 in which said cam means comprises a plurality of similar contiguous cam segments, fixed mounting means by which each of said cam segments is rotatably mounted adjacent one end thereof for rotation about a common axis, and a plurality of similar adjusting screws one of which is operatively connected to the free end of each of said cam segments.

4. The improvement in mechanical integrators as defined by claim 3 in which the said means by which said cam follower is moved longitudinally back and forth in unison with said carriage comprises a rotatable lead screw upon which said cam follower is mounted, said lead screw having the same thread pitch as said lead screw means and adapted to be rotated in unison with said lead screw means by said first gear train.

5. The improvement in mechanical integrators as defined by claim 4 in which the means by which rotary movement of said cam follower is imparted to the said other bevel gear comprises a spur gear driven by said other bevel gear, a rotatably mounted gear segment which meshes with said spur gear and has secured thereto an arm with which said cam follower is maintained in sliding contact.

6. The improvement in mechanical integrators as defined by claim 5 in which one of the gears of said first gear train is rotatably mounted upon the hub of one of the gears of said second gear train and in which a preloaded coiled spring is interposed between said gears with one end thereof connected to one of said gears and the other end thereof connected to the other of said gears, said preloaded coiled spring being operative to eliminate backlash in said gear train.

7. In a mechanical integrator having a base, a pair of spaced parallel supporting brackets secured to said base and extending outwardly therefrom, a disk rotatably mounted on said base between said brackets, a roller the rotation of which represents the output of said integrator rotatably mounted between said brackets with the axis thereof disposed perpendicular to and intersecting the axis of said disk, a pair of spaced parallel lead screws rotatably supported by and between said brackets with the axes thereof disposed parallel to the axis of said roller, a carriage mounted on said lead screws for back and forth movement radially of said disk, and a pair of contacting balls carried by said carriage with one of said balls engaging said disk and the other of said balls engaging said roller, that improvement which comprises; a mechanical differential having a spider shaft, a first bevel gear having a first spur gear secured thereto rotatably mounted on said spider shaft, a second bevel gear having a second spur gear secured thereto rotatably mounted on said spider shaft, a spider secured to said spider shaft between said first and second bevel gears, a pair of pinion gears carried by said spider in mesh with said first and second bevel gears; a first gear train comprising a first output spur gear having a hub rigidly secured to one of said lead screws, a second output spur gear similar to said first output spur gear and having a hub secured to the other of said lead screws, an idler gear interposed between said first and second output spur gears in mesh therewith, said second output spur gear meshing with the said second spur gear which is secured to the said second bevel gear of said mechanical differential, a second gear train comprising a first input gear which is rotatably mounted on the hub of said first output gear, a second input gear similar to said first input gear which is rotatably mounted on the hub of said second input gear, an idler gear interposed between said first and second input gears in mesh therewith, said second input gear meshing with a third input gear which is secured to said spider shaft, and adjustable compensating means connected to the first spur gear which is secured to the said first bevel gear of said differential, said compensating means being operative to automatically advance or retard the rotation of said lead screws in accordance with known errors in the output of said integrator.

8. The improvement in mechanical integrators as defined by claim 7 in which said compensating means comprises vertically adjustable cam means which is disposed parallel to said lead screws and extends from end to end thereof, a rotatably mounted cam follower which is maintained in contact with said cam means, means by which said cam follower is moved longitudinally back and forth in unison with the movement of said carriage, and means by which rotary movement imparted to said cam follower by said cam means is imparted to the said first bevel gear through the said first spur gear connected thereto.

9. The improvement in mechanical integrators as defined by claim 8 in which said cam means comprises a plurality of similar contiguous cam segments, fixed mounting means by which each of said cam segments is rotatably mounted adjacent one end thereof for rotation about a common axis, and a plurality of similar adjusting screws one of which is operatively connected to the free end of each of said cam segments.

10. The improvement in mechanical integrators as defined by claim 9 in which the said means by which said cam follower is moved longitudinally back and forth in unison with said carriage comprises a rotatable lead screw upon which said cam follower is mounted, said lead screw having the same thread pitch as said pair of lead screws and adapted to be rotated in unison with said pair of lead screws by said second gear train through a gear which is mounted on said lead screw in mesh with said third input gear.

11. The improvement in mechanical integrators as defined by claim 10 in which the means by which rotary movement of said cam follower is imparted to the said first bevel gear comprises a rotatably mounted gear segment which meshes with the said first spur gear which is secured to said first bevel gear and has secured thereto an arm with which said cam follower is maintained in sliding contact.

12. The improvement in mechanical integrators as defined by claim 11 in which a pre-loaded coiled spring is interposed between said first input gear and said first output gear with one end thereof connected to said first input gear and the other end thereof connected to said first output gear, said pre-loaded coiled spring being operative to eliminate backlash in said gear train.

References Cited in the file of this patent

UNITED STATES PATENTS

| | | |
|---|---|---|
| 2,271,688 | Forster et al. | Feb. 3, 1942 |
| 2,791,118 | Holtz | May 7, 1957 |